United States Patent [19]

Richman et al.

[11] Patent Number: 4,972,663

[45] Date of Patent: Nov. 27, 1990

[54] COTTON PICKER SPINDLE LUBRICATION SYSTEM

[75] Inventors: Kevin Richman, Aurora; Jesse H. Orsborn, Hinsdale; G. Neil Thedford, Naperville, all of Ill.

[73] Assignee: J. I. Case Company, Racine, Wis.

[21] Appl. No.: 448,216

[22] Filed: Dec. 11, 1989

[51] Int. Cl.⁵ ............................................. A01D 46/08
[52] U.S. Cl. ......................................... 56/12.3; 56/41
[58] Field of Search ................. 56/12.3, 36, 40, 41; 184/6, 7.2, 7.3, 7.4

[56] References Cited

U.S. PATENT DOCUMENTS

| | | | |
|---|---|---|---|
| 2,593,671 | 4/1952 | Hagen et al. | 56/41 X |
| 2,654,204 | 10/1953 | Grosvenor | 56/41 |
| 4,769,978 | 9/1988 | Reichen et al. | 56/12.3 |
| 4,840,018 | 6/1989 | Deutsch | 56/12.3 |
| 4,905,464 | 3/1990 | Thedford | 56/41 X |

FOREIGN PATENT DOCUMENTS 173087 11/1952 Fed. Rep. of Germany ....... 56/12.3

Primary Examiner—Thuy M. Bui
Attorney, Agent, or Firm—Dressler, Goldsmith, Shore, Sutker & Milnamow, Ltd.

[57] ABSTRACT

A system for lubricating picker spindles on a cotton harvester. The lubrication system includes a source of pressurized lubricant located on the cotton harvester and which is connected to a lubricant manifold assembly provided at an upper end of each picker rotor of the cotton harvester. The lubricant manifold assembly defines a cavity which receives lubricant through a lower end of the picker rotor. The manifold assembly further defines a series of lubricant passages which direct lubricant from the cavity toward an upper end of each picker bar and, ultimately, to an inner end of each of the picker spindles and the drive mechanisms therefor.

13 Claims, 4 Drawing Sheets

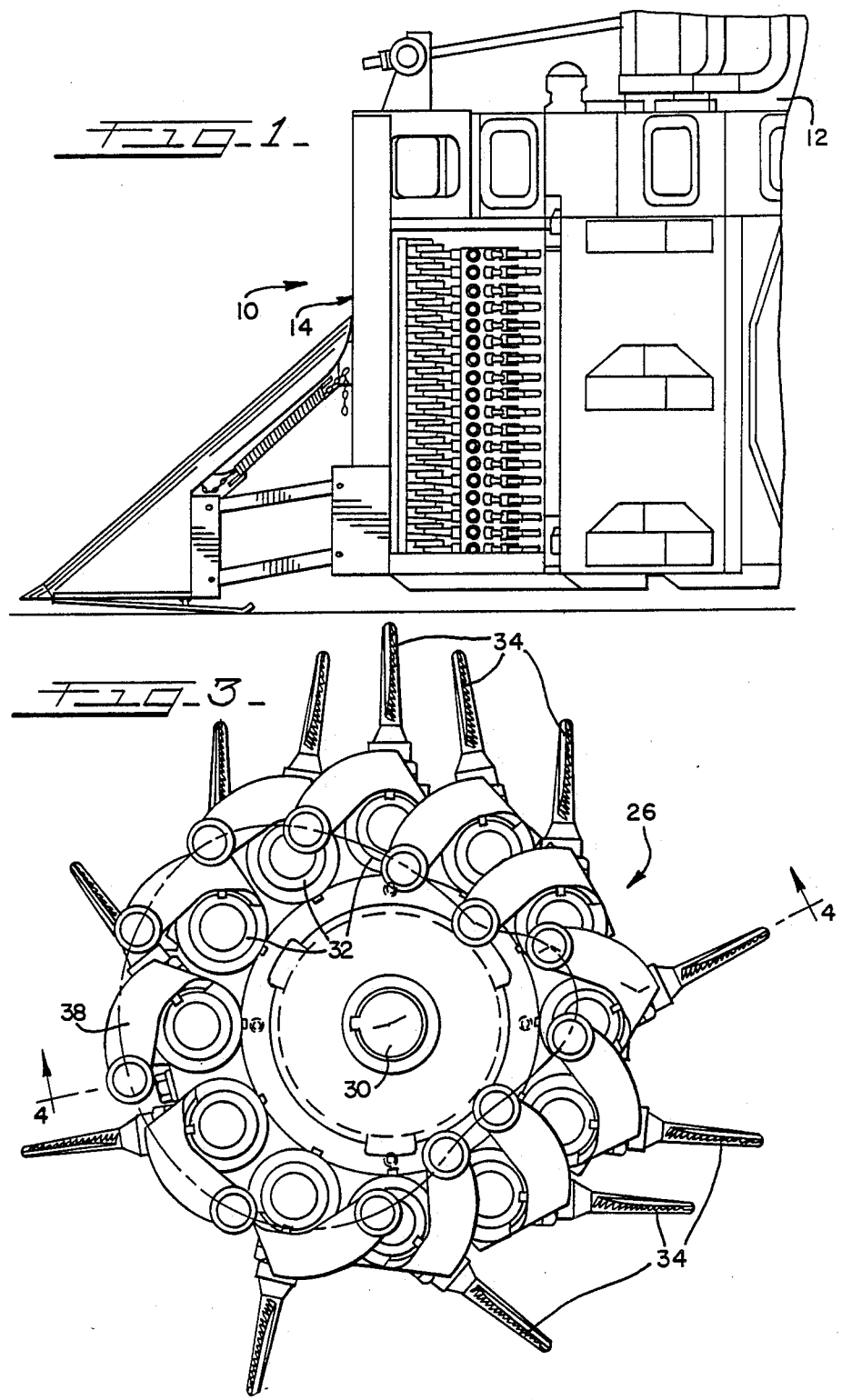

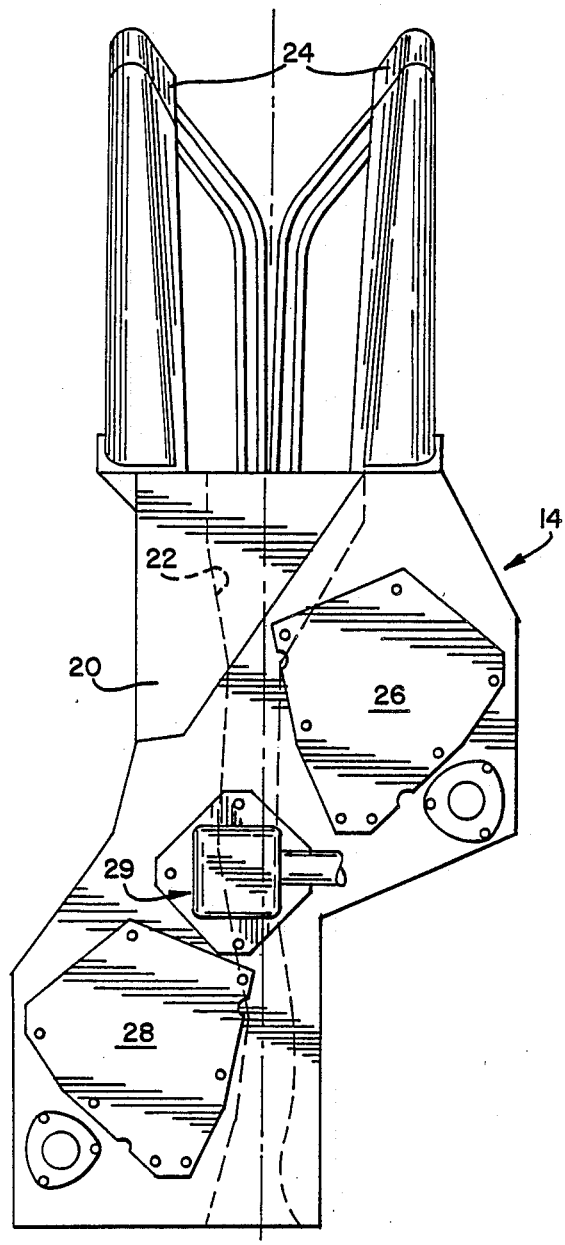
FIG_2

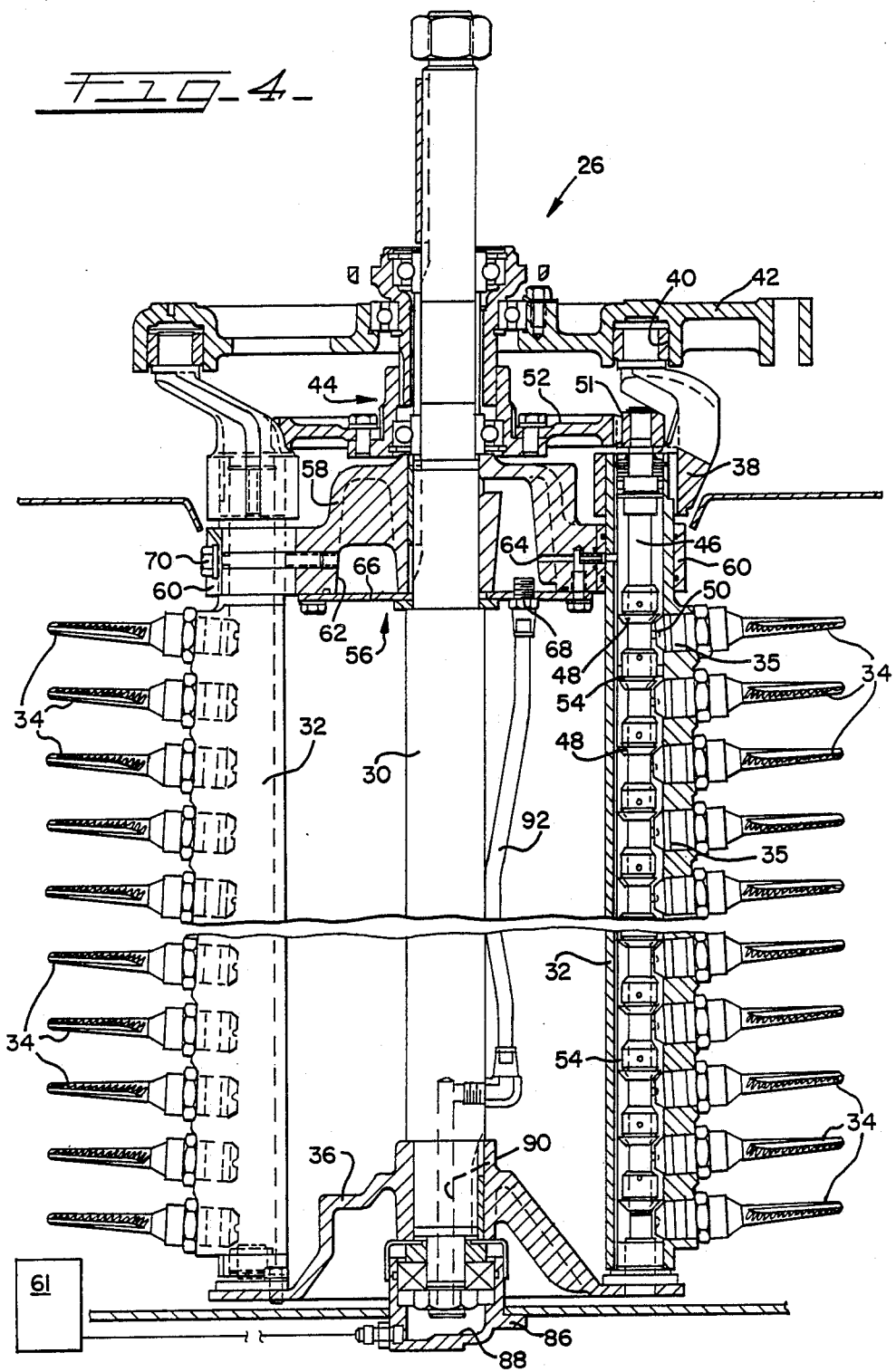

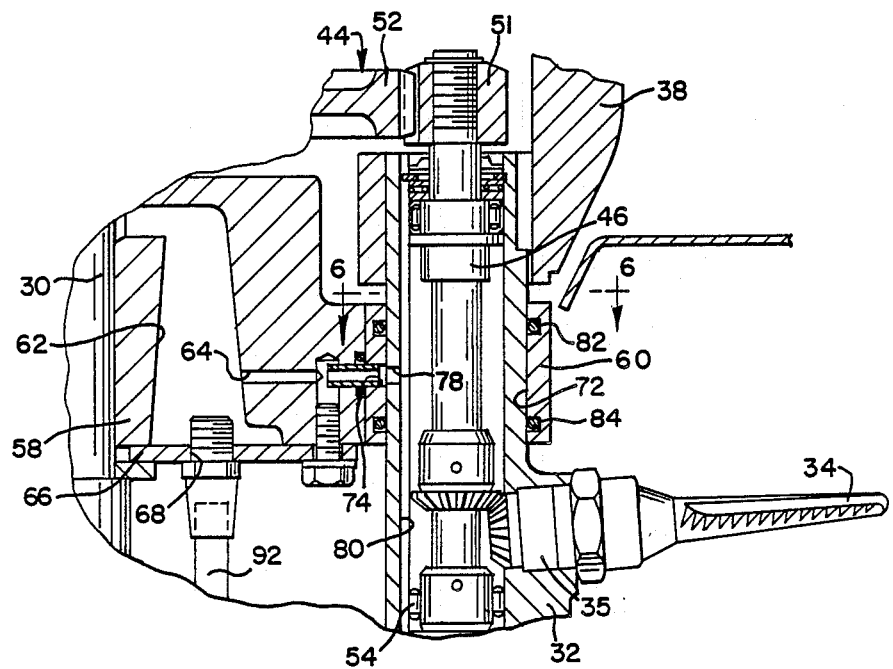
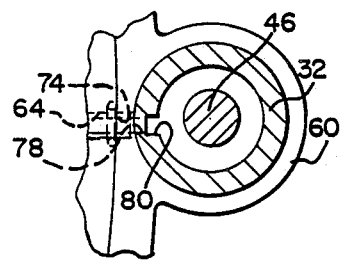

COTTON PICKER SPINDLE LUBRICATION SYSTEM

FIELD OF THE INVENTION

The present invention generally relates to cotton harvesters and, more particularly, to a system for lubricating cotton picker spindles on a cotton harvester.

BACKGROUND OF THE INVENTION

A typical cotton harvester includes between two and five cotton harvesting units supported at the front end thereof. Each harvesting unit includes a housing with a harvesting mechanism. The harvesting mechanism is typically comprised of a pair of upright picker rotors located alongside of a plant passage defined by the housing.

Each picker rotor includes 12-15 vertical picker bars, each of which oscillates about its own vertical axis and includes 14-20 cotton picker spindles radially extending therefrom. Each picker spindle is rotatably driven at an inner end and about its own axis by a bevel gear arrangement accommodated within the picker bar. A suitable drive arrangement transmits power from an input drive shaft to drive each of the picker rotors in timed relation to each other.

To reduce friction, wear, and downtime resulting from rotational movement, each picker spindle and the drive mechanism therefor is frequently lubricated. In previous years, as many as 28 individual lubricant fittings were provided on a harvesting unit of a typical cotton harvester.

Various approaches have been devised to reduce the time and effort required to properly lubricate cotton picker spindles and their drive mechanisms on each picker rotor. One such approach utilizes a centrally located lubricant fitting arranged at an upper end of the picker rotor for delivering lubricant to a lubricant reservoir. Leading from the lubricant reservoir are a plurality of dependent tubes or conduits which feed lubricant to various locations along the picker bar to lubricate the picker spindles and the bevel gear arrangement within each picker bar. To minimize operator involvement, other cotton picker spindle lubrication systems contemplate delivering lubricant to each of such lubricant fittings through a series of lubricant lines or conduits.

Although adequate, such lubrication systems were not without drawbacks. Replacement of a picker bar/picker spindle and other field maintenance operations on the cotton harvesting mechanism involves fitting a rotor wrench over an upper end of the picker rotor to manually position the rotor in order to effect such ends. In those lubrication systems wherein a lubricant line leads to the centrally located lubricant fitting at the upper end of the picker rotors, however, such a lubricant line interferes with proper placement of the wrench and, therefore, the line must be disconnected from its fitting prior to performance of such field maintenance. The need to disconnect a lubricant line from a fitting increases operator frustration and overall downtime for the harvester. Lubricant lines are often contaminated with dirt upon their disassociation with the fitting and/or the operator fails to reconnect the lubricant line after performing the field service operation. Moreover, each of the several lubricant tubes depending from the central reservoir is subject to twist, blockage and/or damage throughout operation of the harvester.

Thus, there is a need and desire for a cotton spindle lubrication system which avoids the above-mentioned drawbacks without sacrificing lubricant capabilities to the picker spindles of the harvester.

SUMMARY OF THE INVENTION

In view of the above, and in accordance with the present invention, there is provided a system for lubricating cotton picker spindles and their drive mechanisms on a cotton harvester. The lubrication system of the present invention includes a source of pressurized lubricant located on the harvester and which is connected to a lubricant manifold assembly. The lubricant manifold assembly includes a manifold arranged toward an upper end of each picker rotor on the harvester. The manifold defines a cavity which receives lubricant through a lower end of the picker rotor. The manifold assembly further defines a series of lubricant passages which direct lubricant outwardly toward an upper interior end of each picker bar and, ultimately, to inner ends of the picker spindles.

In the illustrated embodiment, each harvesting unit includes two picker rotors arranged alongside a passage through which cotton plants are permitted to pass. Each picker rotor includes a series of generally upright and hollow picker bars which both rotate in a predetermined path about a rotor drive shaft and oscillate in a predetermined manner about their own vertical axis. A series of vertically spaced and radially extending picker spindles are rotatably mounted on each picker bar. An inner end of each picker spindle is driven by a rotary drive mechanism including an elongated drive shaft which extends through the center of each picker bar. The drive shaft is journaled by a series of vertically spaced bearings and has a plurality of bevel gear mechanisms which correspond in number to the picker spindles mounted on the picker bar.

In a preferred form of the invention, the manifold assembly includes a series of bearing journals circumferentially secured about the manifold. The manifold is secured to the rotor drive shaft and has a flange-like configuration which radially extends from the drive shaft. The manifold further defines a lubricant receiving cavity with a series of radial passageways extending therefrom. Each bearing journal defines a bore through which a picker bar longitudinally extends. Each radial passageway defined in the manifold is joined in fluid communication with a bore in a bearing journal.

Each picker bar defines an orifice toward its upper end. The orifice in each picker bar opens to a radial passage in the manifold assembly to define a lubricant flow path permitting lubricant to flow from the lubricant receiving cavity in the manifold to an interior of each picker bar. Preferably, seal rings inhibit lubricant from escaping around the picker bars.

In a preferred form, each picker bar further includes at least one longitudinally extending channel. The channel opens to the orifice defined at the upper end of the picker bar to facilitate lubricant flow past the bearings which journal the drive shaft and permits lubricant to migrate along the length of the picker bar and, thereby, to each of the spindle drive mechanisms. The ability of the lubricant to migrate along the length of each picker bar facilitates lubrication of the individual picker spindles over the extended operation of the harvester.

The lubrication system of the present invention is preferably closed to inhibit contamination of the lubricant. In the illustrated embodiment, each picker rotor defines a lubricant chamber located at the lower end of the picker rotor and a suitable conduit for directing lubricant from the chamber to the cavity in the lubricant manifold. To protect against contamination, the chamber in the lubricant manifold is closed and the lubricant is directed thereinto through an input opening.

With the present invention, lubricant is provided to the lubricant manifold through a lower end of the picker rotor. Accordingly, there are no lubricant fittings arranged at an upper end of the picker rotor to interfere with field maintenance. Moreover, a rotor wrench can readily be used to suitably rotate the picker rotors without requiring disconnection of any lubricant lines of the lubricant system. Unlike other devices having a plurality of depending lubricant conduits which are subject to twisting, blockage and damage, the manifold assembly of the present invention defines a plurality of radially extending passages for directing lubricant to the picker bars. Accordingly, the present invention realizes a reduction in the number of parts used to facilitate lubrication of the picker spindles of the cotton harvester.

Numerous other features and advantages of the present invention will become readily apparent from the following detailed description, the appended drawings, and the accompanying claims.

BRIEF DESCRIPTION OF THE DRAWINGS

FIG. 1 is a partial elevational view of a cotton harvester illustrating a harvesting unit connected to a forward end thereof;

FIG. 2 is a schematic plan view of a harvesting unit;

FIG. 3 is a schematic plan view of a typical picker rotor of a harvesting unit;

FIG. 4 is a longitudinal sectional view taken along line 4—4 of FIG. 3;

FIG. 5 is an enlarged sectional view illustrating an upper end of the picker rotor; and FIG. 6 is a sectional view taken along line 6—6 of FIG. 5.

DETAILED DESCRIPTION OF A PREFERRED EMBODIMENT

While the present invention is susceptible of embodiment in various forms, there is shown in the drawings a presently preferred embodiment hereinafter described, with the understanding that the present disclosure is to be considered as an exemplification of the invention and is not intended to limit the invention to the specific embodiment illustrated.

Referring now to the drawings, wherein like reference numerals indicate like parts throughout the several views, there is shown a self-propelled cotton harvester which is depicted only fragmentarily and is seen as represented in its entirety in FIG. 1 by reference numeral 10. Cotton harvester 10 has a fore-and-aft extending frame 12 mounted on ground engaging wheels (not shown).

Positioned forwardly on the frame 12 are a plurality of individual cotton harvesting units 14. Each of the harvesting units 14 includes a harvesting mechanism which removes cotton from a row of cotton plants. The cotton removed from the plants is directed toward a suitable receptacle (not shown). The cotton harvester is of conventional construction such as an 1800 Series sold by Case International and, therefore, will only be described in such detail to describe and orientate the lubrication system of the present invention.

The harvesting units 14 are preferably arranged side-by-side and are of like construction. Accordingly, only one harvesting unit will be described in detail with the understanding that the other harvesting units are similarly constructed. As illustrated in FIG. 2, each harvesting unit includes a housing 20 defining a fore-and-aft crop receiving opening or passage 22. Each harvesting unit is further provided with stalk lifters 24 on either side of opening 22 to guide the row of cotton plants to the opening or passage 22. Each harvesting unit further includes front and rear picker rotors 26 and 28, respectively, which are arranged within the housing 20 alongside the plant passage 22. The picker rotors 26 and 28 are conjointly driven in timed relation to each other by a suitable drive arrangement 29.

The picker rotors 26, 28 are substantially similar in construction to each other. Accordingly, only picker rotor 26 will be described in detail with the understanding that picker rotor 28 is similarly constructed. As illustrated in FIGS. 3 and 4, each picker rotor is supported for rotation about the upright axis of a rotor drive shaft 30. Each picker rotor further includes a plurality of upright and hollow picker bars 32 which rotate about the axis of drive shaft 30 and oscillate about their own vertical axis. Each picker bar 32 includes a plurality of vertically spaced cotton picker spindles 34. An inner end of each picker spindle 34 is journaled for rotation in a suitable bushing 35 with the outer end of the picker spindle extending radially outward therefrom.

As illustrated in FIG. 4, each picker bar 32 is rotatably supported at its lower end by an annular support 36 which is attached to and rotates with the rotor drive shaft 30. A crank arm 38 extends from an upper end of each picker bar 32. The free end of each crank arm 38 rides in a cam track 40 defined by a cam 42 to move each picker bar and the picker spindles carried thereby along a predetermined path of travel as the picker rotor is rotatably driven about the axis of drive shaft 30.

A spindle drive mechanism 44 is provided on each picker rotor for rotatably driving the picker spindles. As illustrated, each picker bar 32 has a hollow center which accommodates a vertical drive shaft 46. Each drive shaft 46 is connected to and rotatably drives each of the picker spindles. As illustrated, the drive shaft 46 is connected to each picker spindle by a bevel gear arrangement including a driving pinion 48 which is in constant mesh with a bevel pinion 50 on the inner end of each spindle 34. The spindle drive mechanism 44 further includes a drive pinion 51 fixed to the upper end of drive shaft 44 and which meshes with a spindle drive gear 52 which is rotatably driven about the rotor drive shaft 30. A series of vertically spaced bearings 54 surround and maintain the drive shaft 44 in alignment with the hollow interior surface of the picker bar.

The lubrication system of the present invention includes a manifold assembly 56 arranged toward an upper end of each picker rotor. As illustrated, each manifold assembly 56 includes an annular manifold 58 with a series of bearing journals 60 circumferentially secured thereabout in equally spaced relation to each other. Each manifold assembly 56 is connected to a source of pressurized lubricant or grease 61 (FIG. 4) located on the harvester 10 for delivering lubricant to each of the picker spindles on each picker rotor.

As illustrated in FIGS. 4 and 5, the annular manifold 58 is secured for rotation with the rotor drive shaft 30 below and in vertical supporting relationship with the spindle drive gear 52 of drive mechanism 44. The manifold 58 defines a lubricant receiving cavity 62 and a series of passageways 64 which radially extend outwardly from the cavity 62 preferably in equally spaced relation relative to each other. As illustrated, the cavity 62 is closed by a cover plate 66 which defines an inlet 68.

To facilitate their replacement, each bearing journal 60 is releasably secured to the periphery of manifold 58 with suitable fastener means 70 (FIG. 4). As illustrated in FIG. 5, each bearing journal 60 defines a bore 72 through which a picker bar 32 longitudinally extends. Each bearing journal 60 further defines a radial port 74 which combines with a passageway in the manifold to define a lubricant passage leading from cavity 62 to bore 72. In the illustrated embodiment, each radial port 74 opens on one side to a radial passageway 64 leading from cavity 62 and opens on its opposite side to the bore 72.

As illustrated in FIG. 5, to facilitate lubricant flow to each of the picker spindles and the drive mechanisms therefor, each picker bar 32 defines an orifice 78 and at least one longitudinally extending channel 80. The orifice 78 defined by the picker bar 32 is in general longitudinal alignment with the radial port 74 defined in the respective journal bearing 60. The longitudinally extending channel 80 opens to the orifice 78 and extends generally the length of the picker bar 32 for permitting lubricant to migrate along the length of the picker bar and thereby defines a conduit which promotes the passage of lubricant past the bearings 54 journaling the drive shaft 44.

Each bearing journal 60 further includes seal rings 82 and 84 arranged above and below the radial port 74 and the orifice 78 on the respective picker bar to promote lubricant flow between the journal bearing 72 and the interior of each picker bar. Seal rings 82 and 84 furthermore define a cavity therebetween which accommodates an adequate supply of lubricant to facilitate adequate lubrication of the picker bar within each bearing journal while inhibiting lubricant from escaping between the journal bearing 60 and the picker bar 32.

The lubricant system of the present invention is substantially sealed to inhibit foreign material from contaminating the lubricant passing through the system. As illustrated in FIG. 4, the lower end of each picker rotor is provided with a centrally located housing 86 defining a lubricant chamber 88 which is connected to the source of pressurized lubricant 61. In the illustrated embodiment, lubricant passes from the chamber 86 through an axial bore 90 preferably defined in the rotor drive shaft 30. Axial bore 90 opens to a suitable elongated conduit 92 extending upward generally parallel to the rotor drive shaft 30 and which opens to the inlet 68 of the lubricant cavity 62 defined in the manifold 58.

In operation, lubricant is passed form the source of pressurized lubricant 61 to the lubricant chamber 88 in the housing 86 arranged toward a lower end of each picker rotor. From chamber 88, lubricant flows upward through axial bore 90 into conduit 92 from whence the lubricant passes into the closed cavity 62 defined in the lubricant manifold 58.

Lubricant is directed radially outward from the receiving cavity 62 along a series of lubricant flow paths toward each of the picker bars. In the illustrated embodiment, each radial passageway 64 directs lubricant flow toward the radial port 74 in each journal bearing 60 and from whence lubricant flows into the orifice 78 on the upper end of each picker bar 32. Although the picker bars are oscillated during operation of the harvester, the longitudinal alignment maintained between orifice 78, passageway 64, and the radial port 74 allows lubricant to pass across the rotating joint established between the picker bar 32 and the journal bearing 60. Moreover, the seal rings 82 and 84 inhibit lubricant from escaping from about the picker bars.

Lubricant flowing into the upper end of each picker bar 32 migrates downwardly in a manner lubricating each of the gear drive mechanisms and an inner end of each picker spindle. The elongated channel 80 defined by each picker bar facilitates passage of the lubricant past the vertically spaced bearings 54 arranged along the length of the drive shaft 44.

With the present invention, an essentially closed system is provided between the source of lubricant and the spindle drive mechanisms thereby inhibiting contamination of the lubricant as it passes toward the spindle drive mechanisms. Lubricant flowing from an upper end of each picker bar allows lubricant to migrate toward the spindle drive mechanisms in a manner facilitating lubrication thereof. As will be appreciated, the ability of the lubricant to migrate downwardly along the length of each picker bar facilitates lubrication of the inner end of the picker spindles during operation of the harvester. Moreover, introducing lubricant from a lower end of the picker rotors promotes access to an upper end of the picker rotors as with a rotor wrench or the like to facilitate field maintenance operations.

From the foregoing, it will be observed that numerous modifications and variations can be effected without departing from the true spirit and scope of the novel concept of the present invention. It is to be understood that no limitation with respect to the specific embodiment illustrated herein is intended or should be inferred. The disclosure is intended to cover by the appended claims all such modifications as fall within the scope of the claims.

What is claimed is:

1. A picker spindle lubrication system for a cotton harvester having a plurality of cotton harvesting units, each harvesting unit including at least two upright picker rotors, each picker rotor having a plurality of gear-driven picker spindles journaled in upright columns on hollow picker bars each of which oscillates about a generally vertical axis, said lubrication system comprising:

a source of pressurized lubricant located on the harvester; and manifold means arranged toward an upper end of each picker rotor for distributing lubricant to each of said picker spindles on each picker rotor, said manifold means defining a series of bores through which the picker bars longitudinally extend, said manifold means further defining a lubricant receiving cavity connected to said source of pressurized lubricant, with a series of radial passages leading from said cavity and opening to each of said bores, and wherein each picker bar defines an orifice permitting lubricant to flow from said radial passages to an interior of each picker bar thereby lubricating an inner end of each gear-driven picker spindle on said picker bar.

2. The lubrication system according to claim 1 further including a lubricant chamber located at a lower end of each picker rotor and conduit means for directing lubricant from said lubricant chamber to said lubricant cavity in said manifold means.

3. The lubrication system according to claim 1 further including means for inhibiting lubricant from escaping between said picker bars and said manifold means.

4. The lubrication system according to claim 1 wherein at least one longitudinally extending channel defined on an interior surface of each picker bar opens to said orifice for directing lubricant therealong.

5. The lubrication system according to claim 1 wherein said source of lubricant is connected to said orifice in each of said picker bars through a lubricant path which is substantially closed to inhibit contamination of the lubricant.

6. A picker spindle lubrication system for a cotton harvester having a plurality of harvesting units, each harvesting unit including at least two upright picker rotors, each picker rotor having a plurality of gear-driven picker spindles supported for rotation by hollow picker bars each of which oscillates about a generally vertical axis, said lubrication system comprising:

a source of pressurized lubricant located on the harvester; and conduit means vertically extending from a lower end of each picker rotor for directing lubricant from said source of lubricant to a lubricant receiving cavity defined by a manifold arranged at an upper end of each of said picker rotors, each manifold having a series of bearing journals circumferentially secured thereabout, with each bearing journal defining a bore through which a picker bar extends, said manifold and said bearing journals combining to define a series of lubricant flow paths leading from said lubricant receiving cavity to said picker bars, and wherein each of said picker bars defines means for directing lubricant from one of said lubricant paths toward an upper interior end of each picker bar such that the lubricant is permitted to migrate downwardly thereby lubricating each of the gear-driven picker spindles.

7. The lubrication system according to claim 6 further including a lubrication chamber located at a lower end of each picker rotor and connected to said source of lubricant, and wherein said conduit means connects said lubrication chamber with the lubricant receiving cavity in said manifold.

8. The lubrication system according to claim 6 wherein said lubricant directing means in said picker bars comprises an orifice which is in longitudinal alignment with a lubricant flow path leading from said cavity.

9. The lubrication system according to claim 8 further including means for inhibiting lubricant from passing between said picker bars and said bearing journals.

10. The lubrication system according to claim 9 wherein said means for inhibiting lubricant from passing includes seal rings provided above and below the orifice defined by each picker bar.

11. The lubrication system according to claim 6 wherein each picker bar further defines at least one elongated channel opening to said lubricant directing means for enhancing migration of the lubricant along the length of each picker bar.

12. The lubrication system according to claim 6 wherein each of said lubricant flow paths includes a passage defined by said manifold and radially extending from said cavity.

13. The lubrication system according to claim 1 wherein said lubricant directing means defined by each picker bar includes an orifice which opens to a lubricant flow path leading from said cavity.

* * * * *